US012743065B2

(12) United States Patent
Kaldobsky et al.

(10) Patent No.: US 12,743,065 B2
(45) Date of Patent: Sep. 22, 2026

(54) SYSTEMS AND METHODS FOR AUXILIARY LOAD CONTROL

(71) Applicant: Ford Global Technologies, LLC, Dearborn, MI (US)

(72) Inventors: Tyler Kaldobsky, Canton, MI (US); Delon Etzel, Ferndale, MI (US); Sergio Duran, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 711 days.

(21) Appl. No.: 18/165,726

(22) Filed: Feb. 7, 2023

(65) Prior Publication Data

US 2024/0264573 A1 Aug. 8, 2024

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
CPC .......... G05B 19/042; G05B 2219/2639; B60R 16/02; B60R 16/03; B60R 16/033
See application file for complete search history.

(56) References Cited

U.S. PATENT DOCUMENTS 9,834,111 B2 12/2017 Grewal et al.
10,222,222 B2 3/2019 Stankoulov
10,295,355 B2 5/2019 Baglino et al.
2005/0109550 A1 5/2005 Buglione et al.
2010/0138138 A1 6/2010 Schoen
2011/0071932 A1 3/2011 Agassi et al.
2013/0226441 A1* 8/2013 Horita ................ G01C 21/3469 701/117
2014/0159660 A1 6/2014 Klose et al.
2014/0278089 A1 9/2014 Gusikhin et al.
2015/0095116 A1* 4/2015 Hyde .................... B60L 53/665 705/7.38
2016/0123752 A1 5/2016 Kandula et al.
2017/0072804 A1* 3/2017 De Miranda ............. B60L 7/16
2019/0308510 A1 10/2019 Beaurepaire et al.
2019/0349470 A1 11/2019 Abramson et al.
2019/0351783 A1 11/2019 Goei
2019/0372345 A1 12/2019 Bain et al.
2020/0070679 A1* 3/2020 Wang ...................... B60L 58/21
2020/0294401 A1 9/2020 Kerecsen
(Continued)

FOREIGN PATENT DOCUMENTS

CN 109747427 A 5/2019

*Primary Examiner* — Chad G Erdman
(74) *Attorney, Agent, or Firm* — McCoy Russell LLP

(57) ABSTRACT

Methods and systems are provided for a mobile application. In one example, a mobile application to be used with a power interface feature of an electric vehicle, the mobile application enabling a user to select stored auxiliary devices to be charged during a planned trip, wherein based upon an electrical load profile stored in memory for the stored auxiliary devices, the mobile application determines an amount of energy that will be spent during the planned trip. In one example, the amount of energy that is spent during the planned trip comprises one or both of a total distance per hour usage for operating one or more auxiliary devices and a total amount of time one or more auxiliary devices can operate before reaching a threshold range.

16 Claims, 6 Drawing Sheets

(56) References Cited

U.S. PATENT DOCUMENTS

| | | | | |
|---|---|---|---|---|
| 2020/0317084 | A1* | 10/2020 | Schaffer | H02J 7/82 |
| 2021/0291688 | A1* | 9/2021 | Hirose | B60L 53/62 |
| 2021/0358279 | A1 | 11/2021 | Folsom | |
| 2022/0111747 | A1* | 4/2022 | Goei | B60L 53/68 |
| 2022/0153156 | A1 | 5/2022 | Goei et al. | |
| 2022/0229541 | A1 | 7/2022 | Penilla et al. | |
| 2022/0266694 | A1* | 8/2022 | Diamond | B60L 1/06 |
| 2023/0314522 | A1* | 10/2023 | Stevo | G01R 31/388 320/132 |
| 2024/0027212 | A1* | 1/2024 | Bhambare | B60L 58/26 |

* cited by examiner

SYSTEMS AND METHODS FOR AUXILIARY LOAD CONTROL

FIELD

The present description relates generally to methods and systems for controlling a power load supplied to an auxiliary device from a vehicle.

BACKGROUND/SUMMARY

In addition to energizing vehicle motion, a power generation system of a vehicle may be used to operate auxiliary devices coupled to power outlets of the vehicle. For example, vehicle engines may be powered by large motor/generators, such as an integrated starter generator (ISG), rather than a conventional alternator. In particular, the ISG of utility vehicles such as trucks may be used to power auxiliary electrical devices in addition to vehicle propulsion. In certain vehicles, power tools may be electrically coupled to the ISG to enable use of the power tools when the truck is in a parked mode.

For example, as shown by Buglione et al. in U.S. 2005/0109550, a vehicle may have at least one electrical outlet configured to deliver power to an auxiliary load. The vehicle may be adjusted to a stationary, power generating mode when auxiliary loads are coupled to the vehicle's power system at a power output panel. The power panel may be configured to automatically initiate arrangement of the vehicle in an operating state suitable for supplying power to the power output panel by varying a position of the panel to provide access to the panel, or, alternatively, the panel position may be adjusted by a manually operated switch.

Electric vehicles may be configured similarly. For example, an electric vehicle may include one or more high voltage outlets electrically coupled to an energy storage device of the vehicle, such as a high voltage battery. An auxiliary device may plug into the high voltage outlet to draw power from the high voltage battery.

However, the inventors herein have recognized potential issues with such systems. As one example, electric vehicles may run out of stored energy when supplying power to an auxiliary load. As another example, the stored energy may be depleted past an amount needed for the electric vehicle to travel to a destination such as a charging station. Some electric vehicles may include cloud-connected technology to monitor and update user of the battery level and usage in real time. Such monitoring may reduce incidence of drawing too much battery power, especially for situations where the user is far from available charging stations. However, available power for auxiliary devices and vehicle travel may be influenced by a variety of factors, such as, vehicle operating conditions, ambient conditions, auxiliary device load, charge rate, and so on. As such, predicting power usage remains a challenge and users may experience uncertainty with regard to how long any particular device may be charged in a given scenario.

In one example, the issues described above may be at least partially addressed by a mobile application for an electric vehicle with a power interface. The mobile application enables the user to select stored devices used for a planned trip, wherein based on an electrical load profile stored in memory for the stored devices, an amount of energy spent during a given trip is determined. In this way, power usage to charge an electronic device may be predicted.

As one example, the user may create device power profiles including their respective power usage and store these in the mobile application. One or more device power profiles may selected as a group and stored along with user preferences as a use case profile. When a use case profile is selected, the system may convert the power rating to a total mile per hour usage for the profile selected or to a total amount of hours the profile may be used before reaching a minimum range threshold. A power use prediction for a given trip may consider factors that influence battery efficiency such as the ambient conditions at the destination, desired rate of charge for the selected devices, vehicle operating conditions such as AC/heat use at the destination, etc. In one example, the mobile application may monitor the device charging and provide updates to the user including, for example, whether actual power consumption deviates from the power use prediction. By providing the user with a power use prediction and monitoring the actual power consumption in real-time, uncertainty with regard to using a power interface of an electric vehicle may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for predicting and controlling power supply between a generator and an auxiliary device. In one example, the generator is an electric machine (e.g., a motor/generator) provided in an electric vehicle (EV) system that is configured to supply power from an energy storage device (e.g., a high voltage battery) to a power interface. The power interface enables onboard charging of auxiliary devices via energy stored in the energy storage device and in doing so reduces the range that the EV may have for travel. In one example, power usage by one or more auxiliary devices charging from the power interface may be predicted by adapting the vehicle with a system allowing a user to create, store, and monitor power use profiles assigned to auxiliary devices. The power use profiles enable the user to estimate how much charge a particular device or set of devices will use. In one example, the profiles may be used to predict whether a desired use will leave the user enough charge for travel. As another example, the profiles may be used to predict how long a user may charge a device given user preferences assigned to the planned use. The power use profiles may be used for monitoring auxiliary device charging in real time thereby enabling the user to use the power interface capability of the vehicle with increased confidence and reduced incidence of using more energy than desired.

Figure 1:
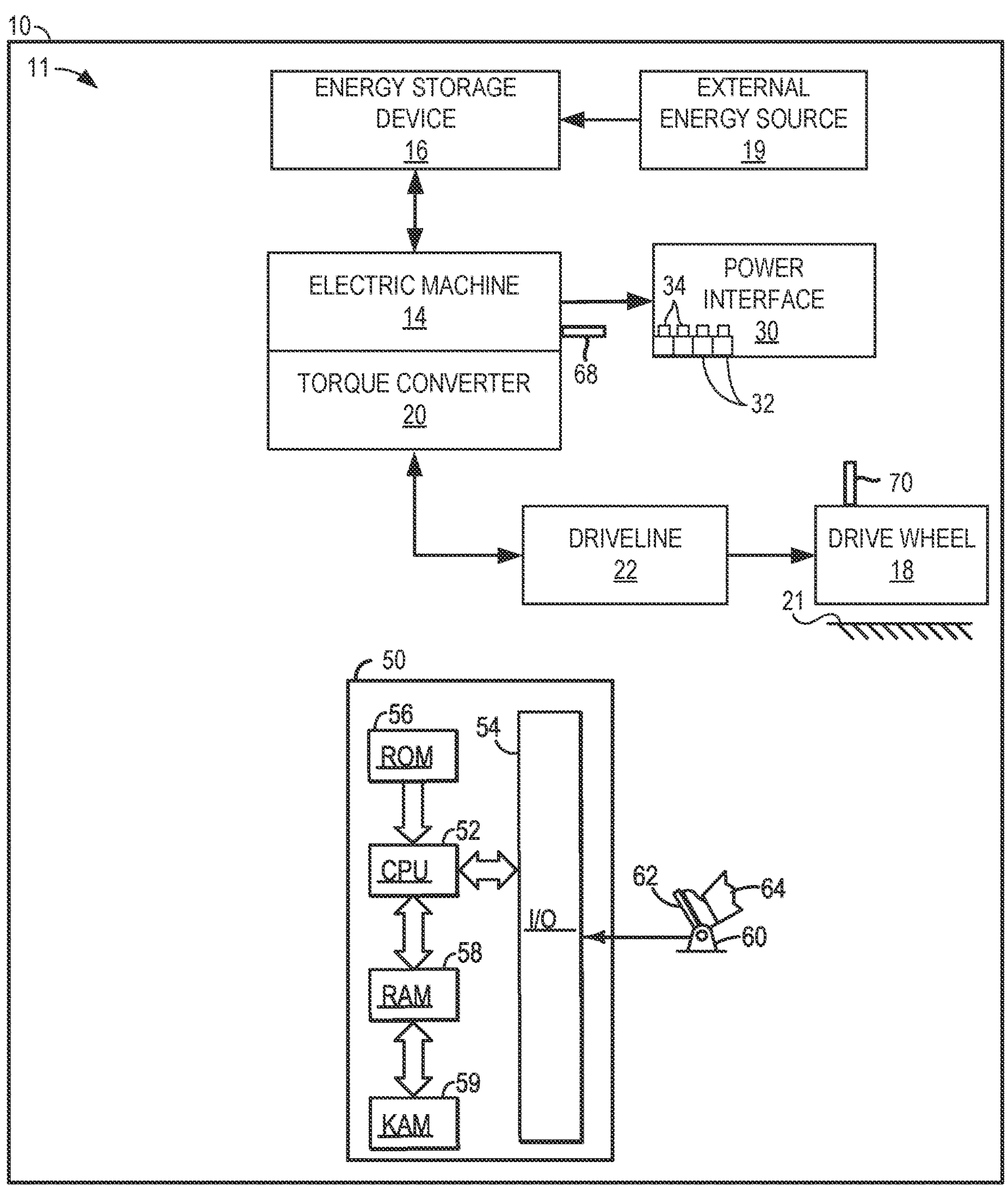
FIG. 1 shows an example powertrain in a vehicle that may be configured to power auxiliary devices.
Figure 2:
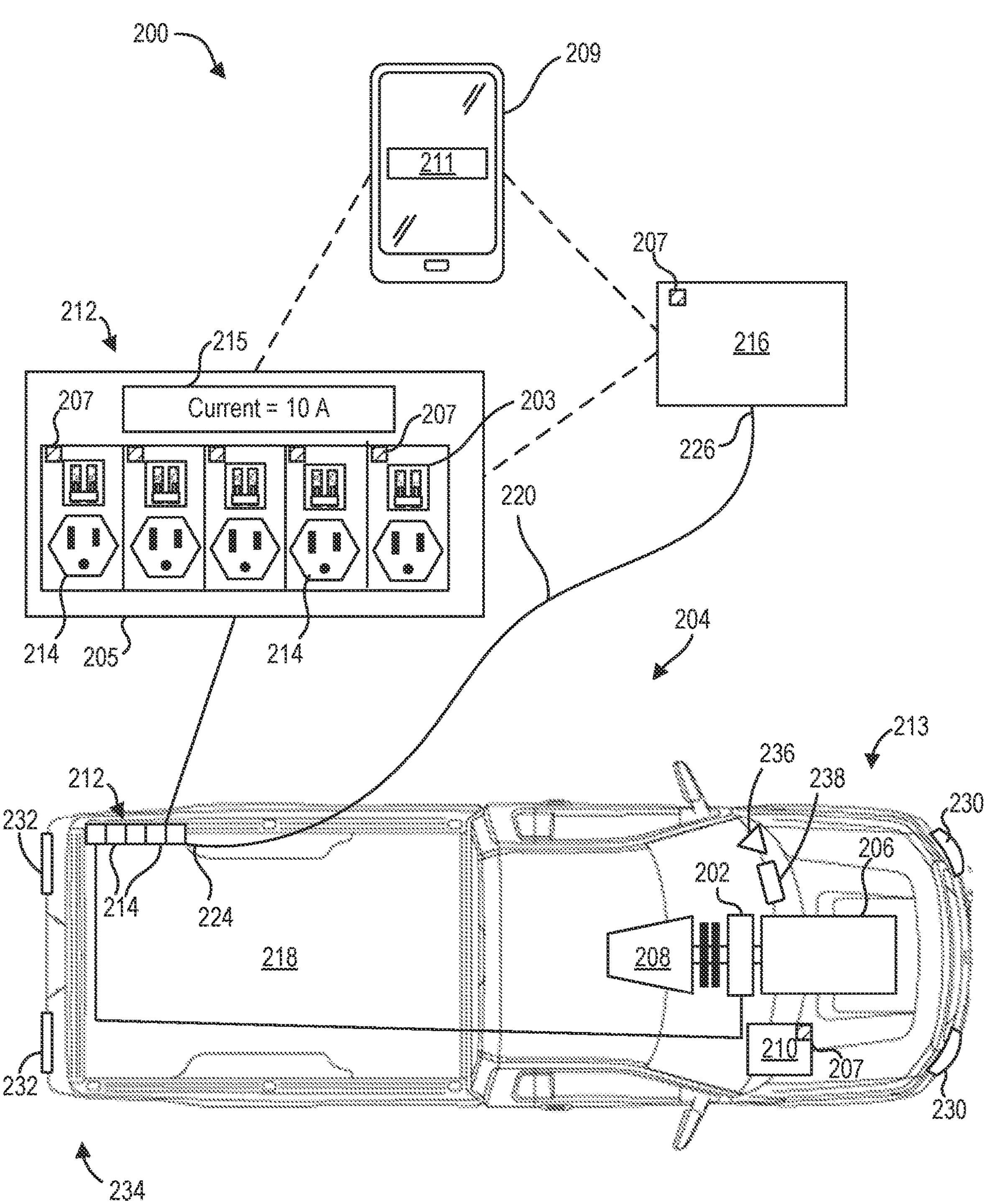
FIG. 2 shows a schematic diagram of an example of a vehicle with a power generator delivering electrical power to an auxiliary device.
Figure 3:
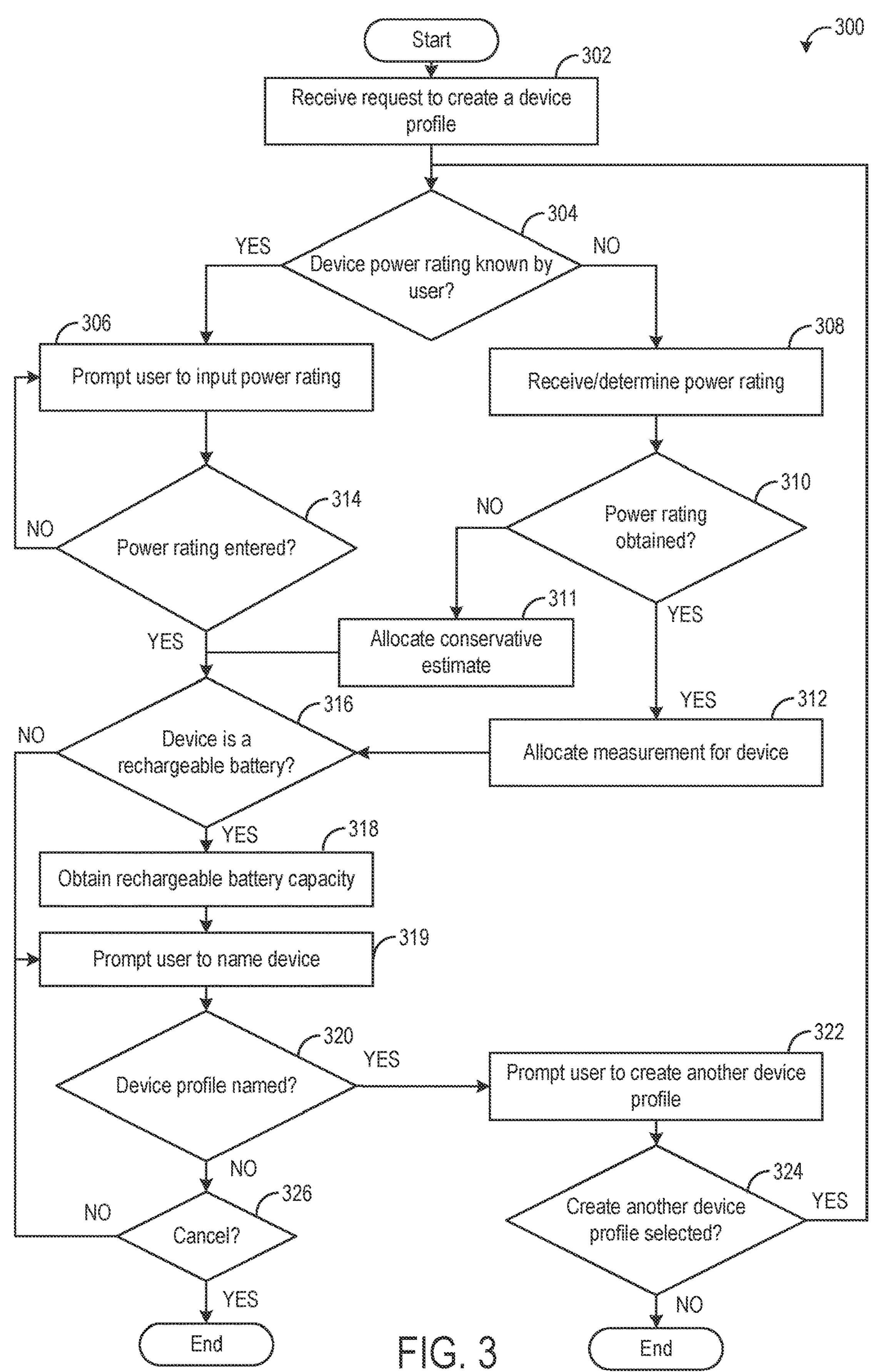
FIG. 3 shows an example of a method for storing a power profile for an auxiliary device.
Figure 4:
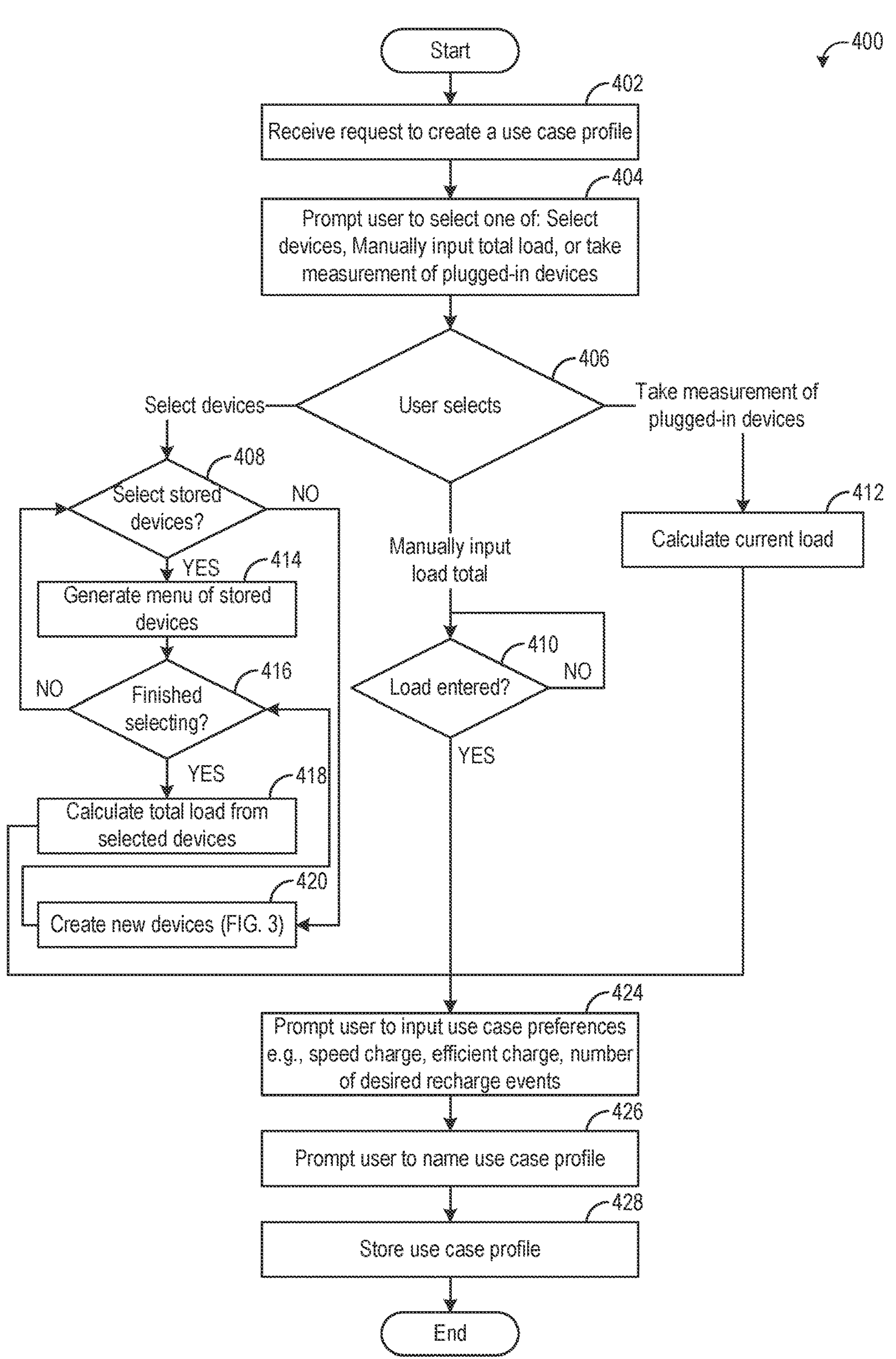
FIG. 4 shows an example of a method for storing a use case profile for an auxiliary device.
Figure 5:
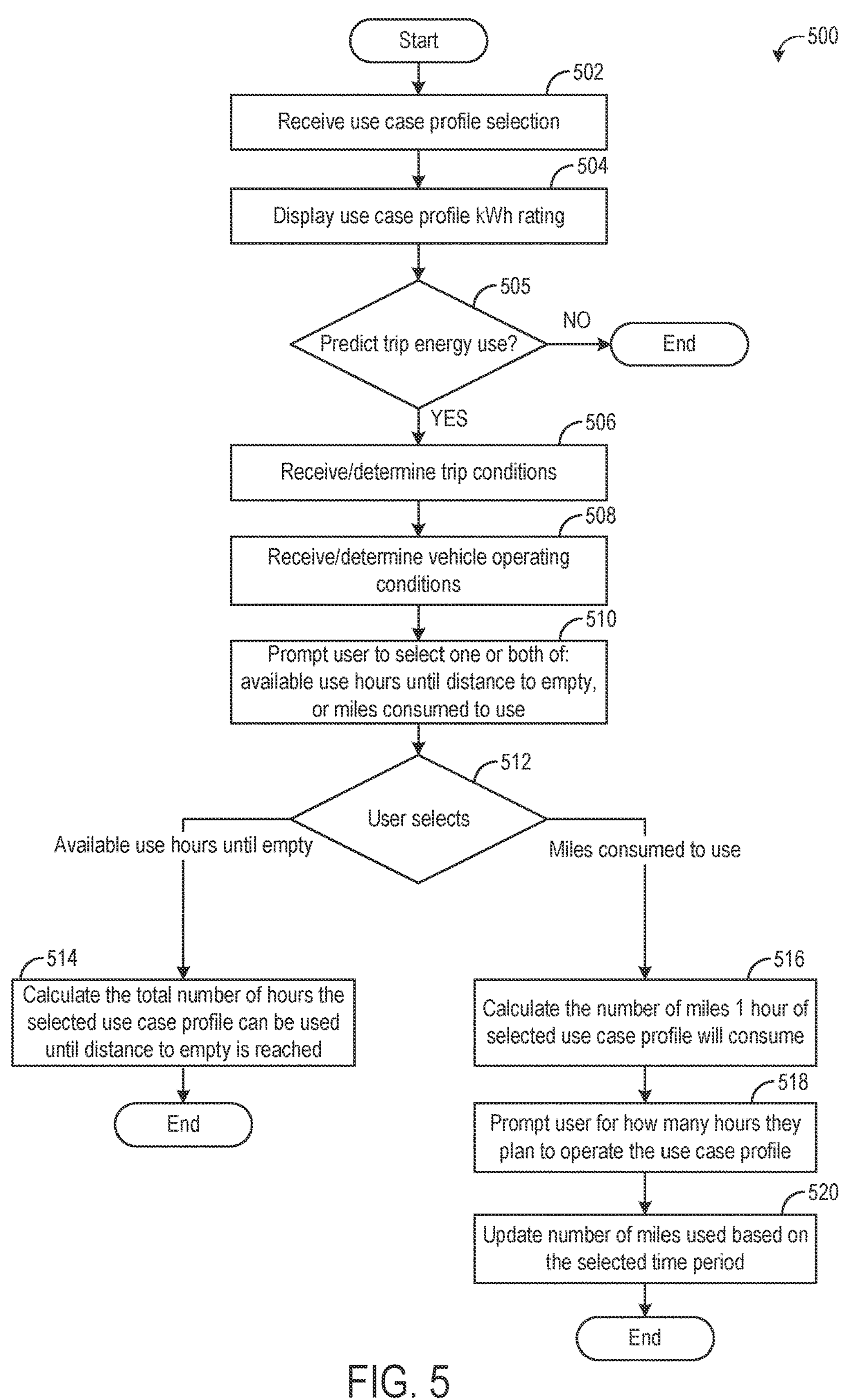
FIG. 5 shows an example of a method for determining a total usable range for a use scenario.
Figure 6:
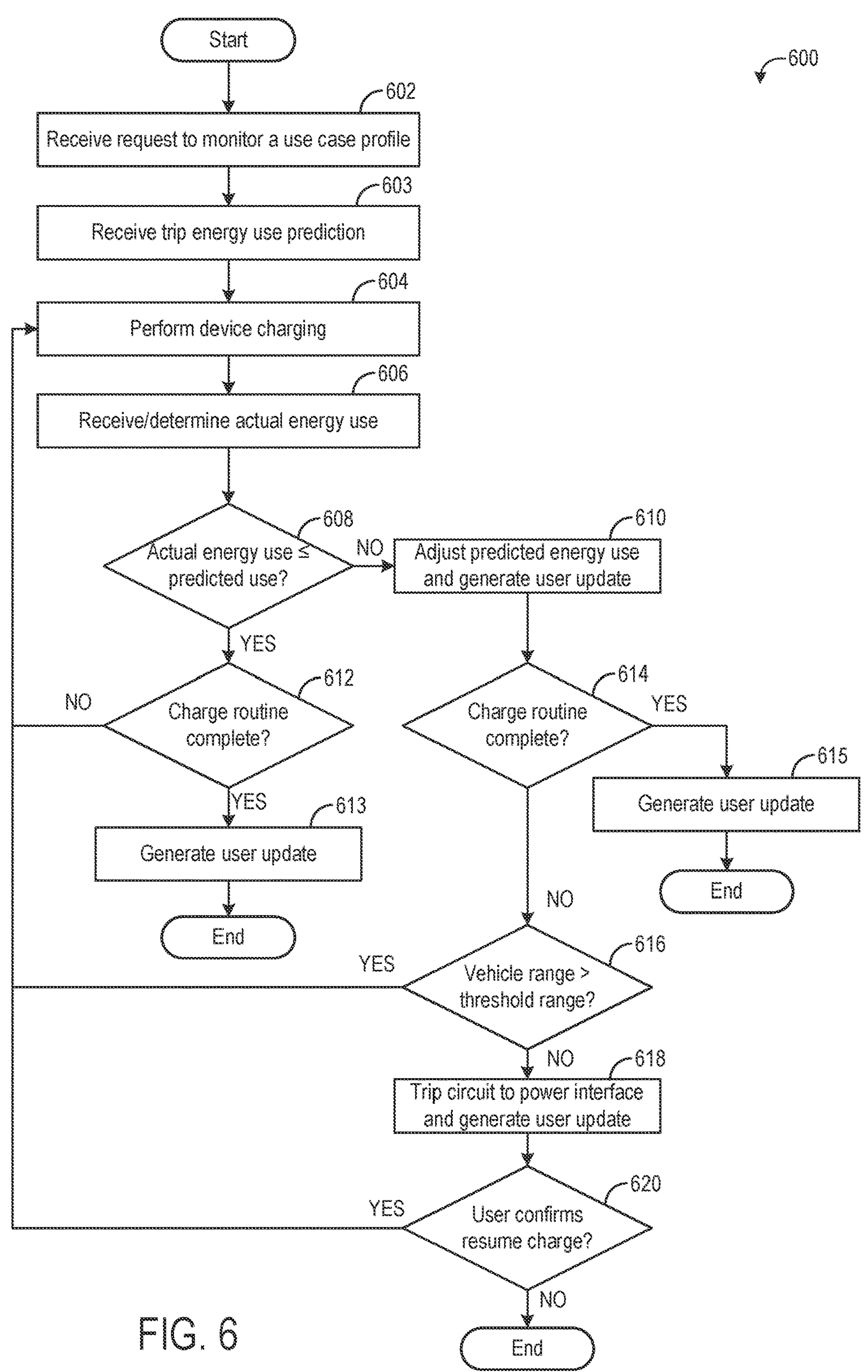
FIG. 6 shows an example of a method for monitoring auxiliary power usage in real time.

The electric machine may be included in an EV powertrain, such as the powertrain shown in FIG. 1, and may be used to recharge a vehicle battery as well as power operation of auxiliary devices. An auxiliary device is depicted in FIG. 2 coupled to the powertrain to draw power from the electric machine via a power interface feature. The auxiliary device may be configured to communicate with a controller of the EV system, including, for example, through a communication link. The controller of the EV system may interact with a mobile application that allows the user to create, store and select trip profiles including power usage predictions for charging selected devices for a given trip. Trip profiles may be built from stored device profiles that are created via the mobile application. An example of a method for creating a device profile is shown in FIG. 3. Trip profiles may additionally include user preferences for selected devices that are indicated via the mobile application. An example of method for creating a use profile is shown in FIG. 4. Based on the use profile for selected devices, the mobile application may provide a predicted power usage for the given trip. An example method for predicting power usage is shown in FIG. 5. The mobile application may monitor in real-time the charging operation for a selected use profile and provide updates to the user based on the actual power usage compared to the predicted usage. An example method for monitoring power usage is shown in FIG. 6.

FIG. 2 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Referring to FIG. 1, the figure schematically depicts a vehicle 10 with a propulsion system 11 (e.g., electric propulsion system). Propulsion system 11 includes an electric machine 14 (e.g., energy conversion device). The electric machine 14 may be incorporated into an axle of the vehicle 10. The electric machine 14 is controlled via controller 50. In some examples, the propulsion system may include an internal combustion engine (not shown).

The electric machine 14 is further shown coupled to an energy storage device 16, which may include a battery, a capacitor, inductor, or other electric energy storage device. The electric machine 14 can be operated to absorb energy from vehicle motion and convert the absorbed energy to an energy form suitable for storage by the energy storage device (e.g., provide a generator operation). The electric machine 14 can also be operated to supply an output (power, work, torque, speed, etc.,) to drive wheels 18 (e.g., provide a motor operation) on a drive surface 21. It should be appreciated that the electric machine 14 may in some embodiments, function only as a motor, only as a generator, or both a motor and generator, among various other components used for providing the appropriate conversion of energy between the energy storage device and the vehicle drive wheels. For instance, the electric machine 14 may include a motor, a generator, integrated starter generator, starter alternator, among others and combinations thereof. The electric machine 14 may also include or be coupled to an inverter. The inverter may be configured to condition electrical energy in and out of the energy storage device (e.g., high voltage battery). However, in other examples, the vehicle may not include an inverter.

The energy storage device 16 may be selectively coupled to an external energy source 19. For example, the energy storage device 16 device may be periodically coupled to a charging station (e.g., commercial or residential charging station), portable energy storage device, etc., to allow the energy storage device 16 to be recharged.

The electric machine 14 is coupled to a torque converter 20. The torque converter 20 is a fluid coupling designed to transfer rotational input from the electric machine 14 to a driveline 22. The driveline 22 includes a transmission with gearing and other suitable mechanical components designed to transfer rotational motion to the drive wheels 18. The mechanical components may include a gearbox, axles, transfer cases, etc., for example. The torque converter 20 and the electric machine 14 are depicted as an interconnected unit. However, in other examples, the torque converter and the electric machine may include discrete enclosures.

The electric machine 14 may include one or more clutches designed to selectively rotationally couple the machine's rotor to torque converter 20. For instance, the clutch or clutches may each include plates, splines, and/or other suitable mechanical components allowing the machine to be rotationally connected as well as disconnected from the engine or the torque converter.

The depicted connections between electric machine 14, driveline 22, and drive wheel 18 indicate transmission of mechanical energy from one component to another, whereas the connections between the electric machine 14 and the energy storage device 16 may indicate transmission of a variety of energy forms such as electrical, mechanical, etc. For example, torque may be transmitted from the electric machine 14 to drive the vehicle drive wheels 18 via the driveline 22. As described above, the electric machine 14 may be configured to operate in a generator mode and/or a motor mode. In a generator mode, propulsion system 11 absorbs some or all of the output from electric machine 14, which reduces the amount of drive output delivered to the drive wheel 18, or the amount of braking torque to the drive wheel 18. Such operation may be employed, for example, to achieve efficiency gains through regenerative braking, increased engine efficiency (if included), etc. Further, the output received by the electric machine 14 may 14 may be used to charge an energy storage device 16. In motor mode, the electric machine 14 may supply mechanical output to the driveline 22, for example by using electrical energy stored in an electric battery. Additionally, an engine may supply rotational output to the driveline 22, in some instances.

The electric machine 14 may also be used to deliver electrical energy to external, auxiliary devices during power take-off. The electric machine 14 may run during power take-off but the drive wheels 18 are not in motion, allowing power output from the electric machine 14 to be directed at least partially towards operating the auxiliary devices. The vehicle 10 may include a power interface 30 arranged along an electrical circuit of the vehicle 10. The power interface may have a plurality of power outlets 32, each outlet electrically coupled to the electric machine, and plugging the auxiliary devices into the plurality of outlets allows power to be supplied to the auxiliary devices. Each of the power outlets 32 are coupled to or have a circuit breaker 34 integrated therein. The arrow extending between the electric machine 14 and the power interface 30 indicates the transfer of electrical energy therebetween. Further details of the power interface are described below, with reference to FIG. 2.

FIG. 1 also shows a controller 50 in the vehicle 10. The controller 50 receives signals from the various sensors of FIG. 1 and employs the various actuators of FIG. 1 to adjust vehicle operation based on the received signals and instructions stored in non-transitory memory of the controller 50. The electric machine, shown in FIG. 2 as a motor generator, may also be controlled by the controller 50. Specifically, controller 50 is shown in FIG. 1 as a conventional microcomputer including: microprocessor unit 52, input/output ports 54, read-only memory 56, random access memory 58, keep alive memory 59, and a conventional data bus. Controller 50 is configured to receive various signals from sensors coupled to the propulsion system 11 and send command signals to actuators in components in the vehicle, such as the electric machine 14. Additionally, the controller 50 is also configured to receive pedal position (PP) from a pedal position sensor 60 coupled to a pedal 62 actuated by a user 64. Therefore, in one example, the controller 50 may receive a pedal position signal and adjust actuators in the electric machine 14 based the pedal position signal to vary the rotational output of the electric machine 14. The sensors communicating with the controller 50 may include an electric machine sensor 68 (e.g., resolver or Hall effect sensor for sensing a rotor position of the electric machine), and wheel speed sensor 70, accelerometer, etc. Additionally, the controller 50 may communicate electronically with one or more mobile applications. For example, a mobile application may enable the user to select stored auxiliary devices to be charged during a planned trip and based upon an electrical load profile stored in memory for the stored auxiliary devices, the mobile application may determine an amount of energy that will be spent during a planned trip. In one example, the controller 50 may include computer readable instructions, that when executed cause the controller 50 to measure an electrical load of one or more auxiliary devices plugged into the power interface and transmit a measurement of the electrical load to the mobile application. In another example, the controller 50 may include instructions that when executed cause the controller 50 to communicate one or more vehicle operating conditions to the mobile application and adjust one or more vehicle operating conditions in response to a command from the mobile application. An example of a mobile application is described in more detail with reference to FIG. 2.

As described above, the electric machine 14 of FIG. 1 may be an electric motor incorporated into an axle in some examples. An example of an electric motor 202 is depicted in a schematic diagram 200 in FIG. 2, arranged in a vehicle 204. As one example, the electric motor 202 may be the electric machine 14 and the vehicle 204 may be the vehicle 10 of FIG. 1. The electric motor 202 may be arranged between an electric energy storage device 206 and a transmission 208 in a front end 213 of the vehicle 204.

The vehicle 204 may also have a power interface 212 which may be disposed in a vehicle bed 218, as shown in FIG. 2. However, in other examples, the power interface 212 may be positioned in some other, accessible region of the vehicle 204. The power interface 212 includes an optional digital display 215 to display information about a status of the power interface 212, e.g., to indicate active power draw through the power interface 212, an overall current flow through the power interface 212, etc. The power interface 212 has a plurality of power outlets 214 configured to receive electrical plugs of electrical devices, such as an auxiliary device 216. The auxiliary device 216 may be coupled to one of the plurality of power outlets 214 by a power cable 220 that is plugged into the power outlet at a first end 224 and connected to the auxiliary device 216 at a second end 226. By plugging the auxiliary device 216 into one of the plurality of power outlets 214, power may be delivered to the auxiliary device 216 from the electric motor 202. In one example, the auxiliary device 216 may include a rechargeable battery that is charged via the power interface 212. The auxiliary device 216 may be used when detached from the power interface 212. In another example, the auxiliary device 216 may be ran directly off the power interface 212 and used while plugged in. Although a single auxiliary device is shown plugged into the plurality of power outlets 214 in FIG. 2, other examples may include more than one auxiliary device coupled to the plurality of power outlets 214 and drawing power from the electric motor 202.

Each of the plurality of power outlets 214 may be equipped with a circuit breaker 203, as shown in insert 205. The circuit breaker 203 may be adapted to interrupt electrical flow through each of the plurality of power outlets 214 when triggered by current flow through the power interface 212 rising above a threshold such as 30 or 40 amps. The circuit breaker 203, arranged in a closed position when the auxiliary device 216 is operating, may be tripped when the current level reaches the threshold and switched to an open position to cut off power supply to the associated outlet of the plurality of power outlets 214 and deactivate the auxiliary device 216. In order to restart the auxiliary device 216, the tripped circuit breaker is reset by switching the circuit breaker back to the closed position. The circuit breaker may be a transistor with current-sensing capability. Therefore, in such an example, the breaker may be manually reset via user action and completed electronically.

A powertrain control module (PCM) 210 may be included, for example, in the controller 50 of FIG. 1. The PCM 210 receives information from sensors arranged in a powertrain of the vehicle 204 and sends instructions to actuators of the powertrain. For example, the PCM 210 may receive a signal from a resolver of the electric motor 202 to infer a power output of the electric motor 202 and command adjustment of electric motor 202 output, e.g., field current, according to active motor operations and electrical loads. The PCM 210 may also control activation of vehicle accessories such as headlights 230, taillights 232, positioned at the front end 213 and a rear end 234 of the vehicle 204, respectively, a speaker or horn 236, and a cabin display panel 238. As such, illumination of the headlights 230 and taillights 232 may be enabled by the PCM 210 as well as emission of noises by the horn 236 and presentation of alerts and notifications at the cabin display panel 238.

The PCM 210 may also communicate with the power interface 212 and the auxiliary device 216 through a communication link. The communication link may be a wireless communication network, such as a Bluetooth low energy (BLE) network, allowing the PCM 210 to monitor electrical and operating statuses of power interface 212 and the auxiliary device 216. For example, the vehicle PCM 210, the plurality of power outlets 214, and the auxiliary device 216 may be equipped with BLE antennae 207, allowing wireless communication between each of the components and between the PCM 210 and an external communication device, such as a mobile phone 209. In other examples, the communication link may be a wired communication link such as a programmable logic controller (PLC) communication link established via the electrical lines coupling the power outlet where the auxiliary device is attached to the PCM. The mobile phone 209 may be similarly adapted to connect to the PCM 210 via a communication link and may be controlled by the user. The communication link established between the mobile phone 209 and the PCM 210 may be similar, in one example, to the communication link between the PCM and the auxiliary devices. However, in other examples, the communication links may be dissimilar. For instance, the PCM may establish a PLC communication link with the auxiliary devices and a wireless communication link with the mobile phone.

A mobile application 211 may be accessed by the mobile phone 209. In one example, the mobile application 211 may be a system for creating, storing, and monitoring power use profiles for auxiliary devices that may be charged by and/or ran directly from the power interface 212. For example, the mobile application 211 may allow the user to detect, name, and store profiles including an associated kWh rating for commonly used auxiliary devices. The mobile application 211 may allow the user to create and save use case profiles, for example, for a group of devices, including storing the associated kWh rating for the group. When requested, the mobile application 211 may convert the kWh rating to a total mile per hour usage. As another example, the user may input a minimum range setting and, when requested, the mobile application 211 may output the total amount of time the profile may operate before reaching the minimum range selection value.

The mobile application 211 may be in electronic communication with the EV. For example the mobile application 211 may connect wirelessly to the EV. In one example, the user can create a device profile for an auxiliary device (e.g., an electrical/electronic device) that they intend to charge at some future time through the power interface 212. The load to charge the auxiliary device can be measured by the PCM 210 or input by the user. For example, the PCM 210 may automatically pair with an auxiliary device that is plugged into the vehicle power outlets, allowing the PCM to detect the item power rating and/or the size of a rechargeable battery and store as a device profile in the mobile application. The device profile may be stored and retrieved at a later time. For example, the user may create a use profile by selecting one or more device profiles along with user preferences. The use profile may include the selected devices and other conditions, such as, how many times the user will recharge the selected devices, charge rate, and so on. In one example, the use profiles may be used to predict whether the desired usage will leave the EV enough charge to transport the user. As another example, the use profiles may be used to predict how long the user may charge the device given real-time operating conditions, such as battery state of charge (SOC), ambient conditions at a destination, etc. The user may decide whether to proceed as planned based on the prediction. As another example, the user may select a use profile from stored use profiles and, in response, the PCM 210 may monitor auxiliary device charging in real time. The PCM 210 may generate updates for the user in response to the use profile using more charge than predicted. Methods for the mobile application 211 are described in more detail with reference to FIGS. 3-6.

The mobile application 211 may help the user by predicting power usage for selected devices prior to embarking on a trip. In doing so, the user can arrange and modify trip plans in advance, giving the user more control and more confidence to use the power interface of the EV system. Moreover, by selecting a trip profile from the mobile application during a trip, the power usage may be monitored in real time, empowering the user with updates about the actual power usage and enabling the user to make adjustments to their power usage during the trip before issues arise.

The predicting and monitoring capabilities may be leveraged to adjust device charging preferences during a trip. For an example scenario, the user may store a use profile for a desired trip. Based on the auxiliary devices selected to charge at the destination, expected battery charge level at the destination, ambient conditions, and other parameters, the battery usage for trip may be predicted and stored as a use profile or a trip profile. Before embarking, the user can select the stored profile in order to monitor real-time power usage. Upon arriving at the destination, the mobile application in communication with the vehicle controller (e.g., PCM 210) may compare the actual trip conditions with the predicted trip conditions. For example, the mobile application may receive compare the actual with the expected battery charge level. For another example, the mobile application may compare the expected ambient temperature at the destination with the actual ambient temperature. The mobile application may re-calculate the predicted battery usage based on the conditions upon arrival at the destination and provide an update to the user in the event the re-calculated prediction deviates from the use profile prediction by more than a threshold. Such an update enables the user to modify their trip plan to more efficiently use the available charge. For example, the re-calculated usage may alert the user that they have enough power to charge the auxiliary device(s) an extra time. As another example, the re-calculated usage may recommend the user to charge their auxiliary device(s) more slowly to achieve the desired charging given the conditions at the destination.

In another example, the mobile application may monitor the auxiliary device charging, and may generate a message to notify the user if the power usage deviates from the predicted usage by more than a threshold. The message may be in the form of a graphical, audio, and/or haptic alert presented on the mobile phone 209 of FIG. 2 that is also connected to the communication link to display a message indicating a status of the use profile. In another example, the message may be provided on a digital display (e.g., digital display 215 of FIG. 2) coupled to the power outlets. In one example, the mobile application may be configured to communicate with any BLE-capable mobile device within a 600 foot range of the EV. Furthermore, generating the message may include commanding the vehicle's lights to flash or activate a vehicle horn to indicate battery usage that deviates from predicted by more than threshold.

By allowing users to create use profiles and monitor their power usage in real time, the users may confidently charge auxiliary devices from the EV power interface at the same time avoiding uncertainty about whether the vehicle battery will run out of power or whether the user will need to make an extra (e.g., unplanned) trip to a charging station. Updates may be provided when actual power usage deviates from predicted and the user may adjust their planned use based on accurate information.

Implementation of a mobile application for a vehicle configured to provide power to auxiliary, accessory devices and monitor power delivered from a power interface of the EV to the auxiliary devices is shown in methods 300, 400, 500, and 600 in FIGS. 3-6, respectively. In one example, the mobile application may be the mobile application 211 and the vehicle may be the vehicle 204 described with reference to FIG. 2. Method 300 is a flowchart describing a routine for creating and storing power usage profiles for an auxiliary devices. Method 400 is a flowchart describing a routine for creating a use case profile including charging one or more auxiliary devices. Method 500 is a flowchart describing a routine for predicting energy use for a use case profile. Method 600 is a flowchart describing a routine for monitoring a selected use case profile. The vehicle may have a controller, such as a PCM, that receives data from various vehicle sensors, such as an engine coolant temperature (ECT) sensor measuring a coolant temperature and a battery charge sensor to monitor SOC of a battery of the EV. The mobile application may also receive signals via a communication link from components and accessories equipped with mechanisms for transmitting information. For example, a power interface of the vehicle may include antennae at each power outlet of the interface to relay information about current flow and voltage to an auxiliary device plugged into an outlet. Instructions for carrying out method 300 and the rest of the methods included herein may be executed by the mobile application in communication with the PCM based on instructions stored on a memory accessible to the mobile application and in conjunction with signals received from the sensors of the EV system. In communication with the mobile application, the PCM may employ actuators of the EV system to adjust EV operations, according to the methods described below. It will be appreciated that in some examples, the methods 300, 400, 500, and/or 600 may be implemented while the vehicle is not in motion (e.g., in a parked mode).

Turning to FIG. 3, a flowchart illustrating the method 300 for creating a device profile in a mobile application for an EV having a power interface is shown.

At 302, the method 300 may include receiving a user request to create a device profile. For example, the user may access the mobile application through a mobile device such as a tablet or mobile telephone. As another example, the user may access the mobile application through an interface of the EV, such as an in-dash touch screen or similar vehicle GUI. Once accessed, the user may select from a menu of the mobile application to create a device profile.

At 304, the method 300 may include determining whether a power rating of the device is known by the user. In one example, the mobile application may prompt the user to indicate whether the power rating is known, such as through a menu option, and the user may select an appropriate option, e.g., yes known, no not known. In one example, the power rating may be the highest power input allowed to flow through the device (e.g., in kWh).

If the device power rating is known by the user, at 306 the method 300 may include prompting the user to input the power rating the device for the device. For example, the mobile application may generate a message requesting that the user manually input the power rating.

At 314, the method 300 may include determining whether the power rating has been entered by the user. For example, the user entering the power rating and saving the entry may indicate completion of the manual entry. In one example, the method may additionally include prompting the user to enter the type of current that the device uses (e.g., alternating current, direct current) and determining whether the type of current has been entered.

If at 304 the device power rating is not known, at 308 the method 300 may include receiving and/or determining the power rating. In one example, the method may include detecting smart devices, such as Bluetooth™ enabled devices. In such an example, the user may be prompted to select from detected devices to transmit the power rating wirelessly. In one example, if wireless communication with the device is not established, the method may include measuring the power rating. In one example, measuring the power rating may include prompting the user to plug in the device and run the device at maximum power. For example, the mobile application may generate a message requesting the user unplug all auxiliary devices from the power interface except the device desired to be measured and run the device on the highest power setting. With the device plugged in, the method may include sending a control signal to the PCM of the EV to measure the device load for a threshold duration and transmit the measurement to the mobile application. The threshold duration may be a non-zero positive value threshold. For example, the threshold duration may be a period of 30 seconds.

At 310, the method 300 may include determining whether the device power rating is obtained. For example, from direct measurement or wirelessly, the power rating may be obtained. If the power rating is obtained, the method 300 may include allocating the measurement for the device at 312. If the power rating cannot be established, for example, the load cannot be read after the threshold duration, and the device cannot communicate wirelessly with the mobile application, the method 300 may include allocating a conservative estimate at 311. For example, the conservative estimate may be a 'best guess" wattage based on user input via menu options. In another example, the conservative estimate may be temporary estimate that may be updated at a later time, for example, during real-time charging and monitoring. In one example, the method may also include measuring or receiving the type of current that the device uses (e.g., AC, DC) and determining whether the type of current is obtained.

At 316, the method 300 may include determining whether the device is a rechargeable battery. For example, the mobile application may generate a message requesting the user to indicate whether the device is a rechargeable battery and based on the user's input the determination may be made. In response to determining the device is not a rechargeable battery, the method may include prompting the user to name the device at 319. In response to determining the device is a rechargeable battery, the method 300 may include obtaining a storage capacity of the rechargeable battery at 318.

At 318, in one example, obtaining the storage capacity may include prompting the user to enter the battery capacity for the device. For example, the mobile application may generate a message requesting that the user manually input the battery capacity for the device. The user may enter the battery capacity and save the entry. In another example, such as for smart auxiliary devices, the battery capacity may be detected wirelessly. The detected battery capacity may be presented to the user via the mobile app and the user may confirm by pressing a button. In another example, the mobile application may measure the battery capacity. For example, the mobile application may provide a menu option to the user to plug in the battery in a low charge state (e.g., 70-75% discharged from full capacity). The mobile application may generate a control signal to the PCM to charge the battery of the device via the power interface. In one example, the PCM may obtain a first vehicle range that may be the vehicle range before charging the battery of the device. The PCM may then generate current to the power interface and charge the battery of the device to full capacity. The PCM may then obtain a second vehicle range that may be the vehicle range after charging the device. The PCM may then estimate the storage capacity based on a difference between the second vehicle range and the first vehicle range. The PCM may communicate the estimate to the mobile application. The power consumed to fully charge the battery of the device may be stored in memory for the device.

At 319, prompting the user to name the device may include the mobile application generating a message requesting that the user manually input a name for the device.

At 320, the method 300 may include determining whether the device name is saved. For example, the user entering the name and saving the entry may indicate completion of inputting the name of the device.

If the device name is not saved, the method 300 may include determining whether the user wants to cancel the entry at 326. For example, the user may wish to not save a device profile for various reasons such as learning the device uses more power than they wish to charge from the EV. If the user indicates they desire to cancel the entry, the method ends. If the user indicates they do not desire to cancel the entry, the method 300 may include prompting the user to name the device at 319.

If the device name is saved, the method 300 may include prompting the user to create another device profile at 322. For example, the mobile application may prompt the user to indicate whether they would like to create another device profile, such as through a menu option, and the user may select an appropriate option, e.g., yes, no. At 324, the method 300 may include determining whether creating another device profile is indicated. In response to determining creating another device profile is indicated, the method 300 may return to 304. In response to determining creating another device profile is not indicated, the method 300 may end.

In one example, a user may create a first device profile, a second device profile, and so on, and the mobile application may store the first device profile, the second device profile, and so on, in memory to be retrieved by the user and used by the mobile application at a later time and/or with other features of the mobile application.

Turning to FIG. 4, a flowchart illustrating the method 400 for creating a use case profile in a mobile application for an EV having a power interface is shown. In one example, the use case profile may be an energy load profile including an associated kWh rating for a group of selected auxiliary devices to be charged during a planned trip. The use case profile may include the selected devices and user preferences for the planned trip.

At 402, the method 400 may include receiving a user request to create a use case profile. For example, the user may access the mobile application through a mobile device such as a tablet or mobile telephone. As another example, the user may access the mobile application through an interface of the EV, such as an in-dash touch screen or similar vehicle GUI. Once accessed, the user may select from a menu of the mobile application to create a use case profile.

At 404, the method 400 may include prompting the user to select one of: select devices, manually input load total, or take measurement of plugged-in devices. For example, the mobile application may generate a message requesting the user's selection, such as via a menu option, and the user may select the appropriate option.

At 406 the user's selection is determined. If the user chooses to select devices, at 408 the method 400 may include determining whether the user wants to select from stored devices. For example, a menu option may be provided to the user and the user may indicate through the menu whether they wish to select from stored devices. In one example, the stored devices may be created and saved during a device profile creation routine, such as described with reference to FIG. 3. If they choose to not select from stored devices, at 420 the method 400 may include generating a menu option to create a new device, such as described with reference to FIG. 3.

If the user chooses to select from stored devices, at 414 the method 400 may include generating a menu of the stored devices. The user may then be prompted to select one or more stored devices and to indicate their complete selection by pressing a "confirm" button, for example.

At 416, the method 400 may include determining whether the user is finished selecting. If the user indicates they are finished selecting, such as indicated by pressing the "confirm" button, at 418 the method 400 may include calculating a total electrical load from the selected devices. In one example, the total electrical load may be calculated as a kWh rating.

If the user indicates they are not finished selecting, the method 400 may return to 408 where the user may be prompted again to indicate whether they wish to select from stored devices.

Returning to 406, if the user chooses to manually input load total, at 410 the method 400 may include determining if the user has entered the load total. For example, the method 400 may include the mobile application providing an option to enter and save a kWh rating. The user entering the load total and saving the entry may indicate completion of the manual entry.

Returning to 406, if the user chooses to take measurement of plugged-in devices, at 412, the method 400 may include calculating a current electrical load. For example, the user may be prompted to run the plugged-in devices at the highest setting. With the devices running, the method 400 may include the PCM of the EV measuring the current electrical load for a threshold time and communicating the measurement to the mobile application. The threshold time may be a non-zero positive value threshold. For example, the threshold time may be a period of 30 seconds. In one example, the current load may be stored as a kWh rating.

After the load for the use case profile has been established (e.g., from selecting devices, manual input, or current load calculation), at 424, the method 400 may include prompting the user to input use case preferences. For example, the mobile application may generate menu of use case preference categories. The user may select from the list, enter their preference, and save the entry. In one example, preferences can be used to differentiate use cases where the same devices will be charged or ran from the power interface but used in different ways that may affect power consumption. For example, use case preferences may influence battery charge and discharge. In a few examples, use case preferences may include a desired speed of charging for a device having rechargeable battery (e.g., fast, slow, efficient, inefficient), a GPS location where the user expects to last charge the EV, a GPS location of where the user plans to charge and/or run the devices, a travel route, a desired number of recharge events for a device having a rechargeable battery, an order in which the devices with be charged, a priority of power use for selected devices, and so on.

In one example, the use case preferences may include a minimum range setting. In one example, the minimum range setting may be user programmable minimum threshold of stored energy expressed as distance (e.g., 50 miles). For example, during auxiliary device charging, the PCM may monitor the vehicle range. In response to vehicle range reaching the minimum range setting, the PCM may stop current to the power interface, for example, by tripping a circuit. In one example, current to the power interface may be restored in response to manual override by the user.

At 426, the method 400 includes prompting the user to name the use case profile. For example, the mobile application may generate a message requesting that the user manually input a name for the use case profile and save the entry to indicate completion of the inputting the name of the device.

At 428, the method 400 includes storing the use profile.

Turning to FIG. 5, a flowchart illustrating the method 500 for predicting energy use for a use case profile is shown.

At 502, the method 500 may include receiving a use case profile selection. For example, the user may access the mobile application through a mobile device such as a tablet or mobile telephone. As another example, the user may access the mobile application through an interface of the EV, such as an in-dash touch screen. Once accessed, the user may select a stored use case profile from a menu of the mobile application. In one example, the use case profile may include one or more auxiliary devices to be powered from the power interface of the EV during a planned trip. The use case profile may also include user preferences.

At 504, the method 500 may include displaying a kWh rating for the use case profile. In one example, the kWh rating for the use case profile may be determined during the creation of the use case profile, such as described with reference to FIG. 4.

At 505, the method 500 may include determining whether the user wants to predict energy use for a trip. For example, the mobile application may prompt the use with a menu option, and the user may select the whether the trip energy use prediction is desired. If the method determines the user does not want to predict trip energy use, the method 500 ends.

In response to determining the user wants to predict energy use, at 506, the method 500 may include receiving and/or determining trip conditions. For example, trip conditions may include the use case preferences for the devices, such as desired efficiency of charging, number of desired recharge events for the trip, a GPS location of where the user plans to charge and/or run the devices, a travel route, and so on. In one example, trip conditions may be predicted based on user preferences. For example, ambient conditions at the trip destination may be predicted from the GPS location.

At 508, the method 500 may include receiving and/or determining vehicle operating conditions. In a few examples, vehicle operating conditions may include the EV battery capacity, EV battery SOC, vehicle cargo and/or tow weight, use of vehicle heating/cooling systems due to ambient conditions, driver profile (e.g., aggressive, conservative, etc.), and so on. In one example, the mobile application may transmit a signal the PCM to request measurement of the one or more vehicle operating conditions. The conditions may be measured by sensors of the EV system and transmitted back to the mobile application. In one example, the vehicle operating conditions may be present conditions that are measured at the time the user requests energy trip prediction. In another example, the vehicle operating conditions may be predicted, for example, based on the user preferences and/or trip conditions. For example, using the GPS location, ambient conditions may be obtained to predict battery charge efficiency at the destination. As another example, the vehicle tow weight may be used to predict SOC of the battery when the EV arrives at the destination. The vehicle operating conditions may be used to more precisely predict trip energy use.

At 510, the method 500 may include prompting the user to select one of: available use hours until distance to empty and miles consumed to use. For example, the mobile application may generate a message requesting the user's selection, such as via a menu option, and the user may select the appropriate option.

At 512 the user's selection is determined. In response to determining the user selects to view available hours until empty, at 514 the method 500 may include calculating the total number of hours the selected use case profile can be used until distance to empty is reached. In one example, distance to empty may be the minimum range setting. In one example, charging an auxiliary device from an EV may be understood as rate of miles (mi) of range per kWh the device uses. The usage may be determined by dividing the vehicle's fully charged range (e.g., 250 mi) by the battery capacity (e.g., 100 kWh) for a miles of range per kWh rate (e.g., 2.5 mi/kWh). Using the minimum range setting (e.g., 50 mi=20 kWh), by subtracting the minimum range setting (e.g., 20 kWh) from the fully charged range (e.g., 100 kWh), a total usable range for the use profile may be calculated (e.g., 80 kWh). In one example, by dividing the total usable range (e.g., 80 kWh) by the use case profile kWh rating (e.g., 2 kWh) the total number of hours that the use case profile may be used may be determined (e.g., 40 hours). In one example, the total number of hours the use case profile may be used until distance to empty may be presented to the user via the mobile application.

In one example, the total number of hours the use case profile may operate may be influenced by the trip conditions and/or vehicle operating conditions. For example, the trip conditions and/or vehicle conditions may indicate the vehicle battery will not be fully charged at the destination or that the device charging may be more or less efficient. For example, the total usable range may factor in the trip route, including, such as, the last location for a full EV charge, geography, and predicted ambient conditions at the destination.

Returning to 512, in response to determining the user selects to view miles consumed to use, at 516 the method 500 includes calculating the number of miles one hour of the selected use case profile will consume. In one example, as above, by dividing the EV's fully charged range (e.g., 250 miles) by the battery capacity (e.g., 100 kWh), the miles of range per kWh rate (e.g., 2.5 mi/kWh) for charging one or more auxiliary devices may be determined. By multiplying the rate (e.g., 2.5 mi/kWh) by the use case profile kWh rating (e.g., 2 kWh) the miles consumed per 1 hour use of the use case profile may be determined (e.g., 5 mi/hr).

In one example, the miles consumed per 1 hour use of the use case profile may be influenced by the trip conditions and/or vehicle operating conditions. For example, the trip conditions and/or vehicle conditions may indicate that the device charging may be more or less efficient at the destination. In one example, the miles per 1 hour of use for the use case profile may be presented to the user via the mobile application.

At 518, the method 500 may include prompting the user to input how many hours they plan to use the use case profile. For example, the user may input an amount of time (e.g., 2 hours).

At 520, the method 500 may include updating the number of miles used based on the selected time period. For example, in response to the user inputting an amount of time, the method 500 may include multiplying the miles consumed per 1 hour of use (e.g., 5 mi/hr) by the user inputted amount (e.g., 2 hours). The updated amount (e.g., 10 mi) may be presented to the user via the mobile application.

Turning to FIG. 6, a flowchart is shown illustrating a method 600 for monitoring energy use during device charging for an EV having a power interface. The method 600 may be included in a mobile application for an EV having a power interface. The method 600 may be executed by the mobile application in coordination with a PCM of the EV and based on sensor signals received from the EV via the PCM.

At 602, the method 600 may include receiving a user request to monitor a use case profile. For example, the user may access the mobile application through a mobile device such as a tablet or mobile telephone. As another example, the user may access the mobile application through an interface of the EV, such as an in-dash touch screen or similar vehicle GUI. Once accessed, the user may select from a menu of the mobile application the use case profile and its monitoring.

At 603, the method 600 may include receiving a trip prediction for the selected use case profile. The selected use case profile may include a corresponding trip energy use prediction. In one example, the trip energy use prediction may be calculated based on the use case profile and include, for example, one or more auxiliary devices be powered from the power interface of the EV during a planned trip, user preferences, trip conditions, and vehicle operating conditions, such as described with reference to FIG. 5. In one example, the trip energy use prediction may be calculated at some time in advance, such as prior to embarking on a planned trip. As another example, the prediction may be calculated immediately prior to device charging.

At 604, the method 600 may include performing the device charging. For example, the auxiliary device may have a rechargeable battery. The user may be prompted to plug in the device until the device is fully charged. In another example, the auxiliary device may be used while plugged into the power interface. The user may be prompted to plug in and operate the device. With the one or more auxiliary devices plugged into the power interface, the PCM may transmit a signal to the electric machine to generate current to the power interface.

In one example, a rate of device charging (e.g., fast, slow, efficient, etc.) may be indicated for the use case profile based on, for example, one or more of user preferences, trip conditions, and vehicle operating conditions. For example, a first use case profile including a first rechargeable battery may have a first rate of device charging (e.g., fast) and second use case profile including a second rechargeable battery may have a second rate of device charging (e.g., efficient). The mobile application may generate a first control signal to command the PCM to generate current at a first power rate for the first use case profile and a second control signal to generate current a second power rate for the second use case profile.

At 606, the method 600 may include receiving and/or determining actual energy use. For example, the mobile application may transmit a signal to the PCM requesting the vehicle battery SOC, distance to empty, and/or battery range. As another example, the mobile application may transmit a signal to the PCM requesting the current electrical load (e.g., kWh rating) of the plugged-in devices. Receiving and/or determining actual energy use may include re-calculating the number of miles 1 hour of the selected use case profile will consume given the present trip conditions and vehicle operating conditions, such as described with reference to FIG. 5. As another example, receiving and/or determining actual energy use may include re-calculating the total number of hours the selected use case profile can be reached until distance to empty is reached given the present trip conditions and vehicle operating conditions, such as described with reference to FIG. 5.

At 608, the method 600 may include determining whether the actual energy use is less than or equal to the predicted use. In one example, the actual distance to empty may be compared to an expected distance to empty. For example, the expected distance to empty may be calculated from the trip energy use prediction and the duration of charging at that moment. In one example, determining whether the actual energy use is less than or equal to the predicted may include determining the difference between the actual energy use and the predicted energy use, and comparing the difference with a threshold difference. The threshold difference may be a non-zero, positive value threshold. In such an example, the method may determine actual energy use is greater than predicted energy use in response to the difference being greater the threshold difference. For example, the threshold may be the difference in actual distance to empty and predicted distance to empty in km.

In response to determining the actual energy use is less than or equal to the predicted use, the method 600 may include determining whether the charge routine is complete at 612. In one example, such as for use case profiles including devices having rechargeable batteries, the mobile application may wirelessly detect the battery level of the one or more plugged in devices. The method may include determining the charge routine is complete based on the battery level of the plugged in devices. In some examples, such as for use case profiles including only devices that are ran directly from the power interface, determining whether the charge routine is complete may be omitted. In one example, the method may include determining the charge routine is complete based on the duration of time input by the user for how many hours they plan to operate the use case profile, such as described with reference to FIG. 5.

In response to determining the charge routine is complete, the method 600 may include generating a user update at 613. For example, the mobile application may generate a message to the user, such as via the user's mobile phone, indicating the fully charged status of one or more devices having a rechargeable battery. The user may unplug the device and use as planned. In one example, in scenarios where device charging uses less energy than expected, the update may include notifying the user. In this way, the user may be able to make additional travel plans and/or power usage plans based on accurate information. For example, the user may decide to charge and use a piece of equipment an extra time.

In response to determining the charge routine is not complete, for example, the devices are only partially charged, the method 600 may return to 604. From 604, the method 600 may continue charging and monitoring energy use during the charging. In this way, power usage may be monitored continuously during device charging. In some examples, a first device may be fully charged and a second device may not be fully charged or the second device may be used while plugged in. In such an example, an update may be provided to the user of the charged status of the first device. The method may include continuing to perform device charging for the second device. In another example, the use case profile may include multiple recharges for one or more devices having a rechargeable battery. In such an example, the method may include determining the charge routine is complete in response to all planned recharge events having occurred.

In response to determining the actual energy use is more than the predicted use, the method 600 may include adjusting the trip energy use prediction and generating a user update at 610. For example, the method 600 may set the trip energy use prediction to the re-calculated number of miles 1 hour of the selected use case profile will consume given the present trip conditions and vehicle operating conditions. As another example, the method 600 may set the trip energy use prediction to the re-calculated total number of hours the selected use case profile can be used until distance to empty is reached given the present trip conditions and vehicle operating conditions. In one example, the mobile application may generate the user update via the user's mobile phone. The update may include the re-calculated trip energy use prediction. The user update may include additional signals, such as an audio, and/or haptic alert presented on the mobile phone and/or the vehicle display. In some examples, the update may include commanding the vehicle's lights to flash or activate a vehicle horn to indicate battery usage that deviates from predicted by more than threshold.

At 614, the method 600 may include determining whether the charge routine is complete. As above, for example, the mobile application may wirelessly detect the battery level of the one or more plugged in rechargeable devices. In one example, the method may include determining the charge routine is complete based on the battery level of the plugged in devices, the duration of operation given the hours of planned use, etc. In some examples, such as for use case profiles including only devices that are ran off the power interface, determining whether the charge routine is complete may be omitted In response to determining the charge routine is complete, the method 600 may include generating a user update at 615. For example, the mobile application may generate a message to the user, such as via the user's mobile phone, indicating the devices have been charged/ran for the amount of time indicated for the use profile.

In response to determining the charge routine is not complete, for example, rechargeable devices are only partially charged or the devices are used while plugged in, the method 600 may include determining whether the vehicle range is greater than a threshold range at 616. In one example, the vehicle range may be a distance to empty, where empty is a user-programmable minimum range setting (e.g., 50 miles). In one example, the threshold range may be the minimum range setting (e.g., 50 miles). In one example, the mobile application may transmit a control signal to the controller of the EV requesting the vehicle range. The EV may determine the vehicle range and communicate the vehicle range to the mobile application. In response to determining the vehicle range is greater than the threshold range, the method 600 may include returning to 604. From 604, the method 600 may continue charging and monitoring energy use during the charging.

In response to determining the vehicle range is less than or equal to the threshold range, the method 600 may include tripping the circuit to the power interface and generating a user update at 618. In one example, the mobile application may generate a signal to the PCM to trip the circuit to the power interface. In one example, the mobile application may generate the user update via a notification sent to the user's mobile phone and/or any mobile phones in wireless communication with the PCM and/or the mobile application. As above, the update may include additional signals, such as audio, haptic, or other signals. In one example, the user update may include prompting the user to confirm, such as via a menu option, that they want to resume charging.

At 620, the method 600 may include determining whether user confirmation to resume charging the device is received. For example, based on the user selecting a menu option via the mobile application, the method 600 may determine to resume charging. In response to determining user confirmation to resume charging is not received, the method 600 may end.

In response to determining user confirmation to resume charging is received, the method 600 may return to 604. For example, the method 600 may continue charging and monitoring energy use during the charging. This allows the user to resume device charging while continuing energy use monitoring.

The following scenario is a prophetic example of a user using the disclosed mobile application for an EV having a power interface. In the example, the user uses the disclosed mobile application to create and save individual item profiles. The user creates and stores a use case profile built from item profiles. The user then selects the use case profile for real-time monitoring of device charging from the power interface of the EV. In one example, the mobile application may be the mobile application 211 and the vehicle may be the vehicle 204 described with reference to FIG. 2. The vehicle may have a vehicle controller, such as PCM 210, that receives data from various vehicle sensors, such as an ECT sensor measuring a coolant temperature and a battery charge sensor to monitor SOC of a battery of the EV. The mobile application may also receive signals via a communication link from components and accessories equipped with mechanisms for transmitting information. The mobile application in communication with the vehicle controller may execute one or more control routines based on instructions stored on a memory accessible to the mobile application and in conjunction with signals received from the sensors of the EV system. In one example, the control routines may include one or more of the methods 300, 400, 500, and/or 600 described with reference to FIGS. 3-6.

The user accesses the mobile application through their smart phone. The user selects to create a device profile for a first auxiliary device. The first auxiliary device is an electric hydrofoil surfboard (e-foil). The e-foil includes a first rechargeable battery having a first capacity. The user is requested to indicate whether they know the power rating for the e-foil battery. The user selects the option indicating that they know the power rating. The user enters the power rating (e.g., 1 kW). The user is requested to indicate whether the device is a rechargeable battery. The user enters the battery capacity (e.g., 3 kWh to fully charge). In response to the user's input, the mobile application prompts the user name the device (e.g., e-foil) and enter the type of current to charge (e.g., DC). The user is requested to indicate whether they wish to create another device profile. The user responds that they do.

The second auxiliary device may be an electric scooter (e-scooter). The e-scooter includes a second rechargeable battery having a second capacity. The user is requested to indicate whether they know the power rating for the e-scooter battery. The user indicates that they do not. In response, the mobile application prompts the user to plug in the device and run the device at maximum power. After measuring the device load for a threshold time, the power rating is detected (e.g., 1 kW). The user is requested to indicate whether the device is a rechargeable battery. The user indicates the device is a rechargeable battery and the battery size is unknown. The mobile application obtains the battery capacity by measuring the power consumption to charge the device from a low charge state (e.g., 2 kWh to fully charge). The mobile application prompts the user name the device (e.g., e-scooter). The user is requested to indicate whether they wish to create another device profile. The user responds that they do.

The third auxiliary device may be a stereo. The user is requested to indicate whether they know the power rating for the stereo. The user indicates that they do not. In response, the mobile application prompts the user to plug in the device and run the device at maximum power. After measuring the device load for a threshold time, the power rating is detected (e.g., 0.5 kWh). The user is requested to indicate whether the device is a rechargeable battery (e.g., no). In response to the user's input, the mobile application prompts the user name the device (e.g., stereo) and enter the type of current to charge (e.g., AC). The user is requested to indicate whether they wish to create another device profile. The user responds that they do not.

In one example, the e-foil may be a first auxiliary device, the first auxiliary device having a first rechargeable battery with a first power rating and a first storage capacity. The e-foil and corresponding power usage profile may be stored in the memory of the controller. The e-scooter may be a second auxiliary device, the second auxiliary device having a second rechargeable battery with a second power rating and a second storage capacity. The e-scooter and corresponding power usage profile may be stored in the memory of the controller. The stereo may be a third auxiliary device, the third auxiliary device having a third power rating. The stereo and corresponding power usage profile may be stored in the memory of the controller.

The user selects to create a use case profile. The use case profile may be a first use case profile. The mobile device prompts the user to select one of: select devices, manually input load total, and take measurement of plugged-in devices. The user chooses to select devices. The mobile device provides a menu of stored devices from which the user selects the e-foil and the e-scooter. In response to the user indicating they are finished selecting devices, the mobile application calculates a total electrical load from the selected devices. The total electrical load is calculated from the first electrical load profile stored in memory for the first auxiliary device, the e-foil, and the second electrical load profile stored in memory for the second auxiliary device, the e-scooter. The mobile application generates a menu where the user may input one or more user preferences. The user inputs a first use case preference that is a number of desired recharge events for the first auxiliary device (e.g., four recharge events for the e-foil), a second use case preference that is the number of desired recharge events for the second auxiliary device (e.g., two recharge events for the e-scooter), and a third use case preference that is a travel destination (e.g., a GPS coordinate) where the charging will be performed (e.g., Blue Lake campground). The mobile application generates a message prompting the user to name the use case profile. The user enters a name (e.g., Blue Lake) and the mobile application stores the first use case profile including the total electrical load profile and the first user preferences.

The user selects the first use case profile via the mobile application. The mobile application displays the total electrical load profile in kWh (e.g., 5 kWh). The mobile application generates a menu option enabling the user to request a trip energy use prediction. In response to the user request, the mobile application receives and/or determines trip conditions and vehicle operating conditions. Using the GPS coordinate provided by the user as a first user preference, the mobile application obtains an ambient condition prediction for the travel destination. The mobile application generates a menu option to select one or both of: available use hours until distance to empty and miles consumed to use. The user selects miles consumed to use, which may be a first user selection. In response to the first user selection, the mobile application calculates a first trip energy use prediction. A miles of range per kWh rate for charging auxiliary devices may be determined by the PCM based on vehicle operating conditions (e.g., including the predicted battery charge efficiency) and transmitted to the mobile application (e.g., 2.5 mi/kWh). By multiplying the rate (e.g., 2.5 mi/kWh) by the use case profile kWh rating (e.g., 5 kWh) the miles consumed per 1 hour use of the use case profile may be determined (e.g., 12.5 mi/hr). Based on the user preferences including the desired number of recharge events, e.g., four times for the e-foil, two times for the e-scooter, the mobile application predicts 40 miles of range may be consumed during the first use case profile. The mobile application displays the first trip energy use prediction, and stores the first trip energy use prediction in memory.

The user selects to create another use case profile. The use case profile may be a second use case profile. The mobile device prompts the user to select one of: select devices, manually input load total, and take measurement of plugged-in devices. The user chooses to select devices. The mobile device provides a menu of stored devices from which the user selects the e-foil and the stereo. In response to the user indicating they are finished selecting devices, the mobile application calculates a total electrical load from the selected devices. The total electrical load is calculated from the first electrical load profile stored in memory for the first auxiliary device, the e-foil, and the second electrical load profile stored in memory for the second auxiliary device, the stereo. The mobile application generates a menu where the user may input one or more user preferences. The user inputs a second use case preference that is the travel destination (e.g., a GPS coordinate) where the charging will be performed (e.g., Mountain Lake campground). The mobile application generates a message prompting the user to name the use case profile. The user enters a name (e.g., Mountain Lake) and the mobile application stores the second use case profile including the total load electrical load profile and the second user preferences.

The user selects the second use case profile via the mobile application. The mobile application displays the total electrical load profile in kWh (e.g., 3.5 kWh). The mobile application generates a menu option enabling the user to request a trip energy use prediction. In response to the user request, the mobile application receives and/or determines trip conditions and vehicle operating conditions. Using the GPS coordinate provided by user a second user preference, the mobile application estimates a vehicle range (e.g., 80 mi) at the travel destination. The mobile application requests from the PCM and receives the minimum range setting (e.g., 40 mi). In addition, the mobile application further estimates a discharge efficiency for the battery based on predicted ambient conditions. The mobile application generates a menu option to select one or both of: available use hours until distance to empty and miles consumed to use. The user selects available use hours until distance to empty, which may be a second user selection. In response to the second user selection, the mobile application calculates a second trip energy use prediction. A minimum usable range may be determined by the PCM based on vehicle operating conditions (e.g., including the predicted vehicle range at destination, minimum range setting, battery efficiency, etc.) and transmitted to the mobile application (e.g., 35 mi). By dividing the minimum usable range by the use case profile kWh rating (e.g., 3.5 kWh) the available use hours until distance to empty may be determined (e.g., 10 hrs). The mobile application displays the second trip energy use prediction, and stores the second trip energy use prediction in memory.

The user selects use case profile monitoring for the second use case profile via the mobile application. In response to the user's selection, the mobile application receives a trip energy use prediction, which may be the second trip energy use prediction stored in memory for the second use case profile. The mobile application displays the total electrical load profile in kWh (e.g., 3.5 kWh). The mobile application generates a message prompting the user to plug in the auxiliary devices (e.g., the e-foil rechargeable battery and the stereo). The mobile application transmits a first control signal to the PCM to perform device charging. The EV supplies power to the devices via the power interface. During the charging, the mobile application transmits a second control signal to the PCM to determine actual energy consumption. The EV obtains the vehicle range and transmits the vehicle range to the mobile application. Based on the vehicle range and the duration of charging, the mobile application determines the actual energy consumption is less than or equal to (e.g., by a threshold amount) the energy use prediction. The mobile application requests the charge level of the e-foil battery from the PCM. The PCM transmits a signal to the mobile application indicating a fully charged status. In response, the mobile application generates a first user update including the fully charged status of the e-foil battery. The user removes the e-foil battery from the power interface and continues to charge the stereo. The mobile application in electronic communication with the PCM continues to monitor the power consumption in real time.

The user recharges the e-foil battery a few more times and continues to charge the stereo. After a duration, the mobile application receives a signal from the PCM indicating that the actual energy use is more than the predicted use by the threshold amount (e.g., 36 mi). In response, the mobile application updates the trip energy use prediction and generates a second user update including the updated energy consumption (e.g., 36 mi). The mobile application transmits a vehicle range request to the PCM and determines the vehicle range is equal to the range minimum (e.g., 40 mi). Therefore, the mobile application transmits a second control signal to the PCM to stop charging. The mobile application generates a second user update including the vehicle range and a menu option to resume charging the auxiliary devices. The user declines to resume charging.

In this way, a mobile application for an EV having a power interface feature may provide accurate energy use predictions and real-time power consumption monitoring. The technical effect of the disclosed methods and systems is reduced incidence of using more power than planned and increased confidence when using a power interface feature of an EV.

The disclosure also provides support for a mobile application to be used with a power interface feature of an electric vehicle, the mobile application enabling a user to select stored auxiliary devices to be charged during a planned trip, wherein based upon an electrical load profile stored in memory for the stored auxiliary devices, the mobile application determines an amount of energy that will be spent during the planned trip. In a first example of the system, the amount of energy that is spent during the planned trip comprises one or both of a total distance per hour usage for operating one or more auxiliary devices and a total amount of time one or more auxiliary devices can operate before reaching a threshold range of an energy storage device of the electric vehicle. In a second example of the system, optionally including the first example, the system further comprises: enabling the user to create the electrical load profile for an auxiliary device, wherein a power consumption of the auxiliary device is obtained by the mobile application and stored as the electrical load profile in memory for the auxiliary device, and wherein the power consumption includes at least one of a power rating and a storage capacity of a rechargeable battery. In a third example of the system, optionally including one or both of the first and second examples, the system further comprises: enabling the user to create a use case profile for a group of auxiliary devices, the use case profile comprising a total electrical load for the group and user preferences, and further comprising enabling the user to obtain a trip energy use prediction for the use case profile, the trip energy use prediction based on the total electrical load, the user preferences, and one or more of trip conditions and vehicle operating conditions. In a fourth example of the system, optionally including one or more or each of the first through third examples, the user inputs a first auxiliary device and a second auxiliary device, the first auxiliary device having a first rechargeable battery having a first capacity and the second auxiliary device having a second rechargeable battery have a second capacity, and wherein a first electrical load profile for the first auxiliary device and a second electrical load profile for the second auxiliary device are stored in memory and selectable by the user to create a use case profile. In a fifth example of the system, optionally including one or more or each of the first through fourth examples, the user creates a first use case profile and a second use case profile, the first use case profile comprising a first auxiliary device, a second auxiliary device, and a first user preference, and the second use case profile comprising the first auxiliary device, the second auxiliary device, and a second user preference, wherein in response to a user request for a trip energy use prediction, the mobile application calculates a first trip energy use prediction for the first use case profile and a second trip energy use prediction for the second use case profile. In a sixth example of the system, optionally including one or more or each of the first through fifth examples, the user requests to monitor a use case profile, the use case profile having a trip energy use prediction for a group of devices, and wherein in response to the user selecting use case profile monitoring, the mobile application transmits a first control signal to a controller of the electric vehicle to charge the group of devices, and wherein during charging, the mobile application adjusts the trip energy use prediction and generates a user update in response to an actual energy use being greater than the trip energy use prediction, and wherein during the charging, the mobile application transmits a second control signal to the controller of the electric vehicle to stop the charging in response to a vehicle range being not more than a threshold range. In a seventh example of the system, optionally including one or more or each of the first through sixth examples, the user creates a first use case profile, the first use case profile comprising a first auxiliary device, a second auxiliary device, and a first user preference, and wherein in response to the user selecting a first trip energy use prediction, the mobile application calculates the first trip energy use prediction based on a total number of hours the first use case profile can be used until distance to empty is reached, and wherein in response to selecting a second trip energy use prediction, the mobile application calculates the second trip energy use prediction based on a number of miles one hour of the first use case profile will consume, and wherein in response to the user selecting the number of hours of planned use, the mobile application updates the second trip energy use prediction based on the number of hours of planned use.

The disclosure also provides support for a method for a mobile application to be used with a power interface feature of an electric vehicle, the method comprising: receiving an electrical load profile for one or more auxiliary devices selected for charging during a planned trip, the electrical load profile stored in memory for one or more auxiliary devices, and predicting an amount of energy that will be consumed during the planned trip based on the electrical load profile. In a first example of the method, the method further comprises: receiving an energy use prediction for the planned trip based on the electrical load profile, charging the one or more auxiliary devices, and during the charging, monitoring the amount of energy that is consumed in real time. In a second example of the method, optionally including the first example, the monitoring comprises receiving an actual energy consumption, and in response to the actual energy consumption being more than the energy use prediction by a threshold amount, adjusting the energy use prediction and generating a first user update, and in response to a vehicle range being not more than a threshold range, stopping the charging and generating a second user update. In a third example of the method, optionally including one or both of the first and second examples, the electrical load profile comprises a total electrical load calculated from one of a power rating stored in memory for the one or more auxiliary devices, manual input from a user, or measurement of a current load of auxiliary devices plugged into the power interface feature of the electric vehicle, and one or more user preferences for the planned trip. In a fourth example of the method, optionally including one or more or each of the first through third examples, the predicting further comprises, receiving one or more of trip conditions and vehicle operating conditions, and in response to a first user selection, calculating a first trip energy use prediction, the first trip energy use prediction being a total number of hours the electrical load profile can be used until distance to empty is reached, displaying the first trip energy use prediction, and storing the first trip energy use prediction in memory, and in response to a second user selection, calculating second trip energy use prediction, the second trip energy use prediction being a number of miles one hour of the electrical load profile will consume, and in response to a user inputting a duration of planned use, updating the second trip energy use prediction based on the duration of planned use, displaying the second trip energy use prediction, and storing the second trip energy use prediction in memory.

The disclosure also provides support for a system comprising: an electric vehicle having a power interface, the power interface enabled to supply energy to an auxiliary device, a mobile application in electronic communication with the electric vehicle, and a controller with computer readable instructions stored on non-transitory memory that when executed during electronic communication with the mobile application cause the controller to: measure an electrical load of one or more auxiliary devices electrically coupled to the power interface, transmit a measurement of the electrical load to the mobile application, communicate one or more vehicle operating conditions to the mobile application, and adjust one or more vehicle operating conditions in response to a control signal from the mobile application. In a first example of the system, the controller further includes computer readable instructions stored on the non-transitory memory that when executed cause the controller to: in response to a request to determine a power rating for a first auxiliary device, and the first auxiliary device being electrically coupled to the power interface, generate current to the power interface, measure the electrical load for a threshold duration, calculate the power rating from the electrical load and the threshold duration, and transmit the power rating to the mobile application, and in response to not obtaining the power rating after the threshold duration, transmit a conservative estimate to the mobile application. In a second example of the system, optionally including the first example, the controller further includes computer readable instructions stored on the non-transitory memory that when executed cause the controller to: in response to a request to measure a total electrical load for a group of auxiliary devices electrically coupled to the power interface, generate current to the power interface, measure the electrical load for a threshold time, and communicate the electrical load to the mobile application. In a third example of the system, optionally including one or both of the first and second examples, the controller further includes computer readable instructions stored on the non-transitory memory that when executed cause the controller to: in response to a request to determine a storage capacity of a rechargeable battery, and the rechargeable battery being electrically coupled to the power interface, obtain a first vehicle range, generate current to the power interface, charge the rechargeable battery to full capacity, obtain a second vehicle range, estimate the storage capacity based on a difference between the second vehicle range and the first vehicle range, and communicate the estimate to the mobile application. In a fourth example of the system, optionally including one or more or each of the first through third examples, the controller further includes computer readable instructions stored on the non-transitory memory that when executed cause the controller to: in response to a request to determine an actual energy consumption, receive or measure the actual energy consumption, the actual energy consumption comprising one of a distance to empty, a battery state of charge, a vehicle range, and a current electrical load of one or more auxiliary devices electrically coupled to the power interface, and transmit the actual energy consumption to the mobile application. In a fifth example of the system, optionally including one or more or each of the first through fourth examples, the controller further includes computer readable instructions stored on the non-transitory memory that when executed cause the controller to: in response to a first control signal based on a request to monitor a use case profile, generate current to the power interface, and in response to a second control signal based on a vehicle range being not more than a threshold range, stop current to the power interface. In a sixth example of the system, optionally including one or more or each of the first through fifth examples, the controller further includes computer readable instructions stored on the non-transitory memory that when executed cause the controller to: generate current to the power interface at a first power rate based on a first control signal and generate current to the power interface a second power rate based on a second control signal, the first control signal generated by the mobile application in response to a first use case preference and the second control signal generated by the mobile application in response to a second use case preference.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms “first,” “second,” “third,” and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term “approximately” is construed to mean plus or minus five percent of the range unless otherwise specified.

The following claims particularly point out certain combinations and sub-combinations regarded as novel and non-obvious. These claims may refer to “an” element or “a first” element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A mobile application to be used with a power interface feature of an electric vehicle, the mobile application enabling a user to select stored auxiliary devices to be charged during a planned trip, wherein based upon an electrical load profile stored in memory for the stored auxiliary devices, the mobile application determines an amount of energy that will be spent during the planned trip, wherein the user requests to monitor a use case profile, the use case profile having a trip energy use prediction for a group of devices, wherein in response to the user selecting use case profile monitoring, the mobile application transmits a first control signal to a controller of the electric vehicle to charge the group of devices, wherein during charging, the mobile application adjusts the trip energy use prediction and generates a user update in response to an actual energy use being greater than the trip energy use prediction, and wherein during the charging, the mobile application transmits a second control signal to the controller of the electric vehicle to stop the charging in response to a vehicle range being not more than a threshold range.

2. The mobile application of claim 1, wherein the amount of energy that is spent during the planned trip comprises one or both of a total distance per hour usage for operating one or more auxiliary devices and a total amount of time one or more auxiliary devices can operate before reaching the threshold range of an energy storage device of the electric vehicle.

3. The mobile application of claim 1, further comprising enabling the user to create the electrical load profile for an auxiliary device, wherein a power consumption of the auxiliary device is obtained by the mobile application and stored as the electrical load profile in memory for the auxiliary device, and wherein the power consumption includes at least one of a power rating and a storage capacity of a rechargeable battery of the auxiliary device.

4. The mobile application of claim 1, wherein the use case profile further comprises a total electrical load for the group and user preferences, and wherein the trip energy use prediction is based on the total electrical load, the user preferences, and one or more of trip conditions and vehicle operating conditions.

5. The mobile application of claim 1, wherein the user inputs a first auxiliary device and a second auxiliary device, the first auxiliary device having a first rechargeable battery having a first capacity and the second auxiliary device having a second rechargeable battery have a second capacity, and wherein a first electrical load profile for the first auxiliary device and a second electrical load profile for the second auxiliary device are stored in memory and selectable by the user to create the use case profile.

6. The mobile application of claim 1, wherein the use case profile is a first use case profile, and further comprising a second use case profile, the first use case profile comprising a first auxiliary device, a second auxiliary device, and a first user preference, and the second use case profile comprising the first auxiliary device, the second auxiliary device, and a second user preference, wherein in response to a user request for the trip energy use prediction, the mobile application calculates a first trip energy use prediction for the first use case profile and a second trip energy use prediction for the second use case profile.

7. The mobile application of claim 1, wherein the use case profile comprises a first auxiliary device, a second auxiliary device, and a first user preference, wherein in response to the user selecting a first trip energy use prediction, the mobile application calculates the first trip energy use prediction based on a total number of hours the use case profile can be used until distance to empty is reached, wherein in response to selecting a second trip energy use prediction, the mobile application calculates the second trip energy use prediction based on a number of miles one hour of the use case profile will consume, and wherein in response to the user selecting the number of hours of planned use, the mobile application updates the second trip energy use prediction based on the number of hours of planned use.

8. A method for a mobile application in communication with a controller of an electric vehicle, the mobile application to be used with a power interface feature of the electric vehicle, the method comprising:

receiving, via the mobile application, an electrical load profile for one or more auxiliary devices selected for charging during a planned trip, the electrical load profile stored in memory for one or more auxiliary devices, wherein the electrical load profile is based on an electric load measured by the controller;

predicting, via the mobile application, an amount of energy that will be consumed during the planned trip based on the electrical load profile; and receiving, via the mobile application, an energy use prediction for the planned trip based on the electrical load profile, charging the one or more auxiliary devices, and during the charging, monitoring the amount of energy that is consumed in real time, wherein the monitoring comprises receiving an actual energy consumption, and in response to the actual energy consumption being more than the energy use prediction by a threshold amount, adjusting the energy use prediction and generating a first user update, and in response to a vehicle range being not more than a threshold range, stopping the charging and generating a second user update.

9. The method of claim 8, wherein the electrical load profile comprises a total electrical load calculated from one of a power rating stored in memory for the one or more auxiliary devices, manual input from a user, or measurement of a current load of auxiliary devices plugged into the power interface feature of the electric vehicle, and one or more user preferences for the planned trip.

10. The method of claim 8, wherein the predicting further comprises, receiving one or more of trip conditions and vehicle operating conditions, and in response to a first user selection, calculating a first trip energy use prediction, the first trip energy use prediction being a total number of hours the electrical load profile can be used until distance to empty is reached, displaying the first trip energy use prediction, and storing the first trip energy use prediction in memory; and in response to a second user selection, calculating second trip energy use prediction, the second trip energy use prediction being a number of miles one hour of the electrical load profile will consume, and in response to a user inputting a duration of planned use, updating the second trip energy use prediction based on the duration of planned use, displaying the second trip energy use prediction, and storing the second trip energy use prediction in memory.

11. A system comprising:

an electric vehicle having a power interface, the power interface enabled to supply energy to an auxiliary device;

a mobile application in electronic communication with the electric vehicle, the mobile application enabling a user to select stored auxiliary devices to be charged during a planned trip, wherein based upon an electrical load profile stored in memory for the stored auxiliary devices, the mobile application determines an amount of energy that will be spent during the planned trip, wherein the user requests to monitor a use case profile, the use case profile having a trip energy use prediction for a group of devices, and wherein during charging the group of devices, the mobile application adjusts the trip energy use prediction and generates a user update in response to an actual energy use being greater than the trip energy use prediction; and a controller with computer readable instructions stored on non-transitory memory that when executed during electronic communication with the mobile application cause the controller to:

measure an electrical load of one or more auxiliary devices electrically coupled to the power interface;

transmit a measurement of the electrical load to the mobile application;

communicate one or more vehicle operating conditions to the mobile application;

adjust one or more vehicle operating conditions in response to a control signal from the mobile application; and in response to a first control signal based on the request to monitor the use case profile, generate current to the power interface, and in response to a second control signal based on a vehicle range being not more than a threshold range, stop current to the power interface.

12. The system of claim 11, wherein the controller further includes computer readable instructions stored on the non-transitory memory that when executed cause the controller to:

in response to a request to determine a power rating for a first auxiliary device, and the first auxiliary device being electrically coupled to the power interface, generate current to the power interface, measure the electrical load for a threshold duration, calculate the power rating from the electrical load and the threshold duration, and transmit the power rating to the mobile application; and in response to not obtaining the power rating after the threshold duration, transmit a conservative estimate to the mobile application.

13. The system of claim 11, wherein the controller further includes computer readable instructions stored on the non-transitory memory that when executed cause the controller to:

in response to a request to measure a total electrical load for a group of auxiliary devices electrically coupled to the power interface, generate current to the power interface, measure the electrical load for a threshold time, and communicate the electrical load to the mobile application.

14. The system of claim 11, wherein the controller further includes computer readable instructions stored on the non-transitory memory that when executed cause the controller to:

in response to a request to determine a storage capacity of a rechargeable battery of the auxiliary device, and the rechargeable battery being electrically coupled to the power interface, obtain a first vehicle range, generate current to the power interface, charge the rechargeable battery to full capacity, obtain a second vehicle range, estimate the storage capacity based on a difference between the second vehicle range and the first vehicle range, and communicate the estimate to the mobile application.

15. The system of claim 11, wherein the controller further includes computer readable instructions stored on the non-transitory memory that when executed cause the controller to:

in response to a request to determine an actual energy consumption, receive or measure the actual energy consumption, the actual energy consumption comprising one of a distance to empty, a battery state of charge, a vehicle range, and a current electrical load of one or more auxiliary devices electrically coupled to the power interface, and transmit the actual energy consumption to the mobile application.

16. The system of claim 11, wherein the controller further includes computer readable instructions stored on the non-transitory memory that when executed cause the controller to:

generate current to the power interface at a first power rate based on the first control signal and generate current to the power interface a second power rate based on the second control signal, the first control signal generated by the mobile application in response to a first use case preference and the second control signal generated by the mobile application in response to a second use case preference.

* * * * *